UNITED STATES PATENT OFFICE.

RICHARD KOREFF, OF PRAGUE, AUSTRIA-HUNGARY.

AZO DYE.

SPECIFICATION forming part of Letters Patent No. 543,212, dated July 23, 1895.

Application filed February 7, 1895. Serial No. 537,635. (Specimens.) Patented in England March 12, 1894, No. 5,143; in France March 27, 1894, No. 237,358, and in Austria June 15, 1894, No. 44/2,468.

*To all whom it may concern:*

Be it known that I, RICHARD KOREFF, a subject of the Emperor of Austria-Hungary, residing at Prague, in the Province of Bohemia, in the Empire of Austria-Hungary, have invented certain new and useful Improvements in new Azo Coloring-Matters and Methods of their Preparation, (for which patents have been obtained in Austria, No. 44/2,468, dated June 15, 1894; in France, No. 237,358, dated March 27, 1894, and in England, No. 5,143, dated March 12, 1894;) and I do hereby declare the following to be a full, clear, and exact description of the invention, such as will enable others skilled in the art to which it appertains to make and use the same.

My invention has for its object the preparation of azo dyes from azo compounds obtained by the condensation in concentrated sulfuric acid of formaldehyde with a primary amin—as, for example, with ortho-toluidin, alpha-naphthylamin, ortho-tolidin, &c.—and by azotizing the amido bases resulting from the condensation.

The amido bases which constitute the primary material from which the new azo dyes are obtained, the preparation of which bases I have fully described in my application for Letters Patent of the United States, Serial No. 507,903, filed April 7, 1894, differ radically from the diamido bases described in patents of the United States, Nos. 516,752 to 516,760, granted to J. J. Brack. It necessarily follows that there is also a radical difference, not only between the azo compounds, but also between the azo dyes obtained from the amido bases in accordance with my invention and the compounds and dyes obtained in accordance with the Brack inventions. This difference has been fully elucidated in my application for patent above referred to, and lies essentially in the fact that the new bases obtained as described therein contain all the amido groups of the primary amins employed in the condensation process in their original form or state, which is incontestably proven by the quantity of nitrite required in the azotizing process, while in the Brack bases the primary amins exist, if not altogether at least to a great extent, in a substituted form or state. At all events the bases thus obtained in accordance with the inventions of Brack do not at any time contain all the amido groups introduced as such, because these are invariably converted in part to imid groups, (NH,) in which state they exist in the bases, as clearly shown by the formulæ in the Brack patent, No. 516,753.

By converting in a well-known manner the amido bases described in my application for patent above referred to into azo compounds by means of a nitrite the unaffected amido groups in the bases are alone or exclusively converted into diazo groups $(N=N)$. It is therefore clear that the azo compounds obtained from my bases, and consequently the dyes derived from said azo compounds, must differ essentially from the azo compounds and azo dyes derived from the bases obtained in accordance with Brack's inventions. This is further evidenced by the fact that it requires four molecules of nitrite to azotize one molecule of one of the bases obtained in accordance with my invention, while but two molecules of nitrite are required to azotize one molecule of the Brack bases. The foundation for this fact, as I have discovered and described in my aforesaid pending application, is that formaldehyde condensed with a primary amin leaves the whole of the amido group intact, provided the condensation is effected by means of "concentrated sulfuric acid," so that the resulting amido bases are invariably primary amins containing no imid groups, from which bases valuable dyes are obtained. When, on the contrary, the condensation is not effected by means of concentrated sulfuric acid, secondary amins are invariably produced, containing not only amido, but also imid groups, and yielding consequently other derivatives than the condensation products from concentrated sulfuric acid.

The azo dyes are obtained by causing the azo compounds derived from the amido bases to act in a well-known manner upon phenols or amins or their sulfo or carbonic acids—as, for example, upon naphthionic acid, (alpha-naphthylamin sulfo-acid 1.4,) beta-naphthol sulfo-acid 2.6, beta-naphthol disulfo-acid R, salicylic acid, &c. These azo dyes, which contain one or several azo groups, consist, according to the phenols, amins, or their sulfo or carbonic acids used in their preparation, of pulverulent bodies of different colors, which dye cotton yellow, blue to blue-black, and claret to scarlet-red, respectively.

As an example I will now describe the mode of obtaining one of these azo dyes, from which the mode of obtaining the others can be readily deduced. The base, as obtained by the condensation of formaldehyde with ortho-tolidin in concentrated sulfuric acid, is dissolved in hydrochloric acid of thirty-three per cent., and a sufficient quantity of water in the proportion of 21.8 kilos of the base to fifty-five kilos hydrochloric acid. To the cooled solution 13.8 kilos of nitrite are then added, whereby the corresponding tetrazo body will be formed, which is poured into a solution of seventy kilos naphthionate of soda and forty-two kilos acetate of soda. An insoluble intermediate product is immediately formed, which after stirring for some time is converted into the coloring-matter. The mass is then boiled, rendered alkaline, filtered, and dried.

The new coloring-matter is a red-brown powder, easily soluble in water, and imparting a red color to the solution, which latter gives with hydrochloric acid a blue, and with caustic soda a red, precipitate. The coloring-matter furthermore yields, when dissolved in concentrated sulfuric acid, a blue solution, which when diluted yields a blue precipitate.

The coloring-matter dyes cotton red in an alkaline bath.

The reactions take place according to the following equations:

*Azotizing of the Base.*

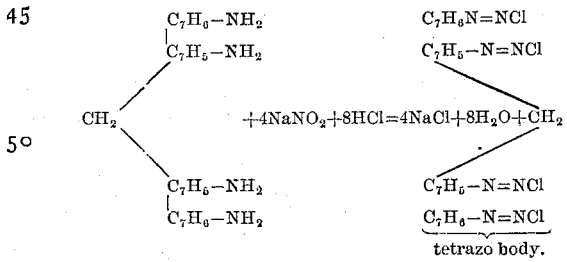

*Combination of the Tetrazo Body, &c.*

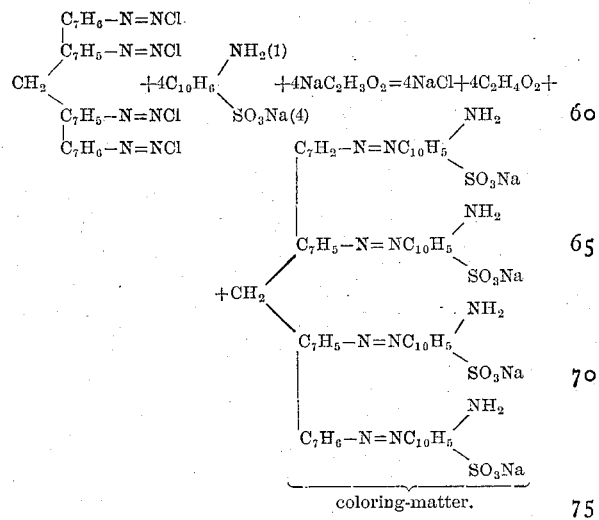

Having thus described my invention, what I claim as new therein, and desire to secure by Letters Patent, is—

1. The process, which consists in causing a tetrazo derivative of an amido base containing no imid group or groups to act upon an amin or phenol or their sulfo or carbonic acids.

2. The process, which consists in causing one molecule of a tetrazo derivative of an amido base containing no imid group or groups, to act upon four molecules of an amin or phenol or their sulfo or carbonic acids.

3. The process of obtaining red dyes, which consists in causing one molecule of the tetrazo derivative of an amido base, as the base resulting from the condensation, in concentrated sulfuric acid, of formaldehyde with tolidin, to act upon four molecules of an amin or phenol or their sulfo or carbonic acids as naphthionic acid, substantially as set forth.

4. The herein-described azo-dye derived from formaldehyde tolidin, pulverulent in a dry state, of a red-brown color, forming, when dissolved in water (in which it is readily soluble) a red solution, dyeing cotton red in an alkaline bath, and yielding, when dissolved in sulfuric acid, a blue solution.

In testimony whereof I affix my signature in presence of two witnesses.

RICHARD KOREFF.

Witnesses:
BEINDAL COHEN,
ADOLPHE FISCHER.